Dec. 17, 1968  D. W. WHITE  3,416,967
ELECTRICAL DEVICE COMPRISING METAL OXIDE CONTAINING
SOLID ELECTROLYTE AND ELECTRODE
Filed June 10, 1965
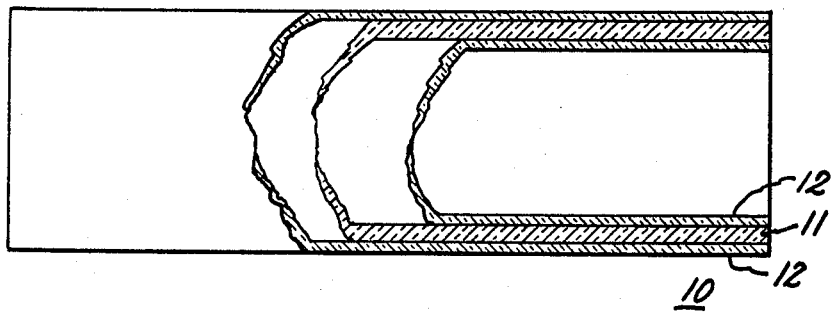
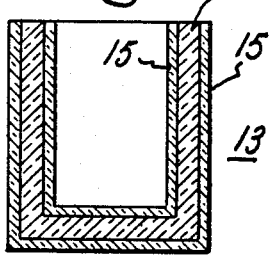  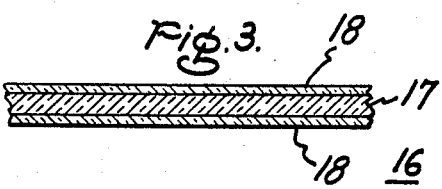
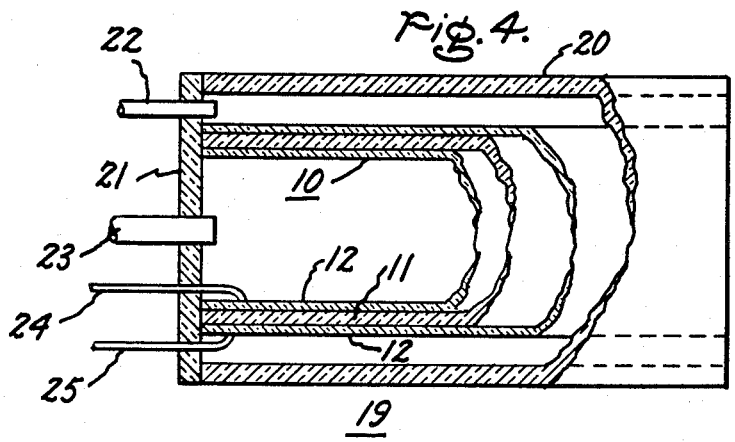
Inventor:
Donald W. White,
by Paul R. Webb, II
His Attorney.

United States Patent Office 3,416,967
Patented Dec. 17, 1968

3,416,967
ELECTRICAL DEVICE COMPRISING METAL OXIDE CONTAINING SOLID ELECTROLYTE AND ELECTRODE
Donald W. White, Burnt Hills, N.Y., assignor to General Electric Company, a corporation of New York
Filed June 10, 1965, Ser. No. 462,849
2 Claims. (Cl. 136—86)

This invention relates to high temperature fuel cells, and more particularly to composite articles providing electrode-electrolyte-electrode structures or electrolyte-electrode structures or electrolyte-electrode structures for such high temperature fuel cells.

Fuel cells, operable at high temperatures in the range of 1000° C. to 1200° C., are shown in U.S. Letters Patent 3,138,487 and 3,138,490 which are assigned to the same asignee as the present application. Each of these fuel cells employs a solid oxygen-ion conducting electrolyte, solid electrodes, fuel and oxidant supplies for the respective electrodes, and electrical leads connected to the respective electrodes. Such fuel cells provide a low voltage direct current power source on a continuous basis. Such cells have application in various chemical process industries, such as the manufacture of aluminum and the electro-refining of copper. Furthermore, these cells can be employed to operate direct current motors.

In a fuel cell of the above type, it would be desirable to minimide the amount of silver employed as the cathode; to minimize the exposed surface area of the silver, and to provide an electrode which functions as either a cathode or anode. The present invention is directed to an improved composite article providing an electrode-electrolyte-electrode structure or electrolyte-electrode structure for a high temperature fuel cell.

It is an object of my invention to provide an improved composite article forming an electrode-electrolyte-electrode structure for a high temperature fuel cell.

It is another object of my invention to provide an improved composite article forming an electrolyte-electrode structure for a high temperature fuel cell.

It is a further object of my invention to provide an improved high temperature fuel cell which employs an improved composite article.

In carrying out my invention in one form, a composite articel comprises a solid oxygen-ion conducting member, and an adherent electrode on one surface of the member, the electrode consisting of an oxygen-ion conducting metal oxide and, at least partially dissolved therein, 2 weight percent to 40 weight percent of uranium dioxide.

These and various other objects, features and advantages of the invention will be better understood from the following description taken in connection with the accompanying drawing in which:

FIGURE 1 is a sectional view of a composite article embodying my invention;
FIGURE 2 is a sectional view of a modified composite article;
FIGURE 3 is a sectional view of another modified composite article; and
FIGURE 4 is a sectional view of a high temperature fuel cell which employs a pair of solid electrodes embodying my invention.

In FIGURE 1, a composite article or body is shown generally at 10 which comprises a solid oxygen-ion conducting electrolyte 11 in the form of a hollow tubular member of stabilized zirconia, and a pair of solid electrodes adhering tightly on opposite surfaces of electrolyte 11. Each electrode, which is preferably non-pourous, consists of an oxygen-ion conducting metal oxide and, at least partially dissolved therein, 2 weight percent to 40 weight percent of uranium dioxide.

While both of the above electrodes 12 are described above as being identical, one of these electrodes is employable as the anode and a different cathode is provided as a tightly adherent layer on the opposite surface of electrolyte 11. For example, the cathode consists of lithiated nickel oxide, doped tantalum pentoxide, or a solid, porous oxygen-ion conducting metal oxide matrix with silver impregnated in and filling the pores thereof. If an electrode 12 is used as the cathode, another anode material is employable therewith. For example, the anode consists of an intimate dispersion of nickel in a compatible solid oxygen-ion conducting material; or a solid oxygen-ion conducting metal oxide matrix, and silver impregnated in and filling the pores thereof. The cathode or anode is positioned on either the inner or outer surface of electrolyte 11.

In FIGURE 2 of the drawing, there is shown a modified composite article or body 13 in the form of a container which comprises a solid oxygen-ion conducting electrolyte member 14, and a pair of solid electrodes 15 adhering tightly on opposite surfaces of electrolyte 14. Each electrode 15 has the same composition as electrodes 12 in FIGURE 1 of the drawing.

In FIGURE 3 of the drawing, there is shown another modified composite article 16 in the form of a plate. Article 16 comprises a solid oxygen-ion conducting electrolyte 17, and a pair of solid electrodes 18 adhering tightly on opposite surfaces of electrolyte 17. The composition of each electrode 18 is identical with the composition of electrodes 16 in FIGURE 2 and electrodes 12 in FIGURE 1 of the drawing.

In FIGURE 4 of the drawing, there is shown a high temperature fuel cell 19 which includes composite article 10 of FIGURE 1 of the drawing. Composite article 10 comprises a solid oxygen-ion conducting electrolyte 11 in the form of a hollow tubular member of stabilized zirconia, and a pair of solid electrodes 12 adhering tightly on opposite surfaces of electrolyte 11. Electrodes 12 shown in FIGURE 4 are identical in composition with electrodes 12 as shown in FIGURE 1 of the drawing. Electrode 12 on the exterior surface of electrolyte 11 functions as a cathode while electrode 12 on the interior surface of electrolyte 11 functions as the anode. An outer, hollow member 20 such as a tube of alumina surrounds and is spaced from the exterior surface of cathode 12 to provide an air passage between cathode 12 and the inner surface of tube 20. A cover 21, for example, the same material as tube 20, is provided at the inlet end of tube 20.

An inlet tube 22 extends into the air passage between cathode 12 and tube 20 to introduce a gaseous oxidant containing molecular oxygen from a source (not shown) into this passage. A second tube 23 is provided through cover 21 and communicates with the space defined by the interior wall of anode 12 within electrolyte 11. Tube 23 introduces a fuel, such as hydrogen, from a source (not shown) into this space. A conducting metallic lead 24, for example, of nickel, extends through cover 21 and is in contact with anode 12. A conducting metallic lead 25, for example, of platinum or palladium, extends through cover 21 and is in contact with cathode 12 of the cell. The free ends of leads 24 and 25 are connected to apparatus, such as an electric motor (not shown), being operated by the cell. While both electrodes of this cell are shown as constructed with the above-described gas impervious electrodes to provide a suitable high temperature fuel cell, a different cathode or anode is suitable for this cell as it was described above.

A very satisfactory composite article for a high temperature fuel cell operable above 600° C. is provided by a solid oxygen-ion conducting member with one or both electrodes consisting of an oxygen-ion conducting metal oxide and, at least partially dissolved therein, 2 weight percent to 40 weight percent of uranium dioxide.

I found that such an electrode is a mixed conducting oxide electrode which provides both ionic and electronic conductivity. The oxygen-ion conducting metal oxide provides the ionic conductivity while solution in it of uranium dioxide provides the electronic conductivity. The preferred electrode structure is non-porous. However, the porosity of the electrode structure is not critical to its operation. The improved composite article of my invention is employable in the form of a hollow tubular member, a flat plate or a container.

The preferred range for uranium dioxide in such an electrode is from 2 weight percent to 40 weight percent of the electrode. The preferred oxygen-ion conducting metal oxide in our electrode structure and for our electrolyte member is solid stabilized zirconia. However, other solid oxygen-ion conducting metal oxides, such as doped thoria, are satisfactory for incorporating the uranium dioxide therewith.

Solid stabilized zirconia, which is a solid oxygen-ion conducting electrolyte material, is a compound with a cubic crystal structure consisting of zirconia to which is added at least one or a combination of several specific oxides such as calcium oxide, yttrium oxide, or a mixture of rare earth oxides. For example, a suitable solid zirconia material is stabilized with 14 molecular percent calcium oxide. Other compositions of stabilized zirconia, which are employable for the oxygen-ion conducting member and as the oxygen-ion conducting metal oxide in the electrode, are discussed in "Oxide Ceramics" by Ryshkewitch, Academic Press, 1960, particularly on pages 354, 364 and 376 thereof.

Solid doped thoria is also a solid oxygen-ion conducting electrolyte material which consists of thoria to which is added at least one or a combination of several specific oxides such as calcium oxide, yttrium oxide, or a mixture of rare earth oxides. For example, a solid doped thoria consists of thoria which is doped with the addition of 4 molecular percent calcium oxide to increase its conductivity.

An efficient stable fuel cell is constructed which comprises a solid oxygen-ion conducting material as the electrolyte, an electrode in contact with one surface of the electrolyte, means for supplying a gaseous oxidant containing molecular oxygen to the electrode, a second electrode in contact with the opposite surface of the electrolyte, means for supplying a fuel to the second electrode, and at least one of the electrodes consisting of an oxygen-ion conducting metal oxide and, at least partially dissolved therein, 2 weight percent to 40 weight percent of uranium dioxide.

In such a fuel cell, a gaseous oxidant containing molecular oxygen is supplied during cell operation to the electrode which functions as the cathode. Fuel is supplied during cell operation to the electrode functioning as the anode. Either or both of these electrodes is a composite electrode as described above.

In the preparation of the composite article shown in FIGURES 1, 2 and 3 in the drawing, the solid oxygen-ion conducting electrolyte of stabilized zirconia is prepared from zirconia powder to which has been added approximately 14 molecular percent calcium oxide. The material is formed into a hollow tubular member, a container or a flat plate shown in FIGURES 1, 2 and 3. If desired, the solid stabilized zirconia can be purchased commercially. The mixed conducting oxide electrode is formed on one surface or a pair of such electrodes are formed on both surfaces of the solid stabilized zirconia electrolyte to provide a composite article. For example, calcia stabilized zirconia powder has added thereto 2 weight percent to 40 weight percent of uranium dioxide, which powders are then mixed and ground together. This mixture is then calcined at 1350° C. which results in a partially sintered product. This partially sintered product is reground to provide a powder. The reground powder is made into a slurry with a 5 percent aqueous solution of polyvinyl alcohol.

The slurry is then painted onto the inner surface, outer surface, or onto both surfaces of the stabilized zirconia electrolyte, such as the hollow tubular member shown in FIGURE 1 of the drawing. An electrically continuous network of metallic electrical conductors might be placed adjacent to one or both surfaces of the stabilized zirconia electrolyte so that it is embedded in the slurry to promote collection of current from the electrodes of a complete fuel cell. An assembly of the solid stabilized zirconia electrolyte with the slurry painted thereon is then dried, as for example, by infra-red heating to remove moisture and to form a composite article. This composite article is then assembled with other components as described above to form a fuel cell 19 as shown in FIGURE 4 of the drawing.

Heat, such as waste heat, is supplied from a source (not shown) to fuel cell 19 to raise the temperature of electrolyte 11 and electrodes 12 of cell 19 to a preferred temperature of 1350° C. or higher to sinter the composite article. If desired, such heating is done prior to assembly of fuel cell 19. If the sintering of composite article 10 is done in cell 19, the temperature is, if desired, changed for fuel cell operation to a different temperature above 600° C. A gaseous oxidant containing molecular oxygen, such as air, is supplied through tube 22 to the air passage between cathode 12 and the interior surface of tube 19. A gaseous fuel, such as hydrogen, is supplied through tube 23 to the chamber defined by the interior of electrode 12, the anode. The reaction at the surface of the cathode is as follows:

(1) 
$$O_2 + 4e \rightarrow 2O^=$$

The oxygen ions move through the cathode 12 and electrolyte 11 to combine with hydrogen in accordance with the following reaction at the surface of the anode.

(2) 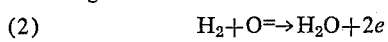
$$H_2 + O^= \rightarrow H_2O + 2e$$

The electrons, which are given up at the anode, are conducted through lead 24 to apparatus, for example, an electric motor (not shown), being operated while oxygen at the cathode combines with the returning electrons. Water vapor, which is generated at the anode, is released through the opening at the right-hand end of the cell to the atmosphere.

Examples of electrode material embodying my invention are as follows:

Four mixed conducting oxide electrodes in rod form were prepared which consisted of an oxygen-ion conducting metal oxide of calcia stabilized zirconia, and at least partially dissolved therein, 10, 20, 30 and 40 weight percent of uranium dioxide, respectively. One oxide electrode in rod form was prepared which consisted only of an oxygen-ion conducting metal oxide of stabilized zirconia. The above first four mixed conducting oxide electrodes were made by dry mixing the respective oxides, pressing and sintering at elevated temperatures. The stabilized zirconia electrode without uranium dioxide addition was prepared in a similar manner.

Subsequently, the above rods were tested to determine whether they possessed both ionic and electronic conductivity thereby showing them to be mixed conducting oxide materials. The presence of both ionic and electronic conductivity is shown by a change in conductivity when the material is exposed to different oxygen partial pressures. The presence of only ionic conductivity is shown by an absence of change in conductivty under the above conditions. The above rods containing 10 weight percent and 30 weight percent uranium dioxide and the rod containing zero weight percent of uranium dioxide were exposed to different oxygen partial pressures. These different partial pressures each consisted of one atmosphere of oxygen, argon and water, hydrogen and air. The conductivity of the above rods with the above uranium dioxide additions changed in the different oxygen partial pressures while the conductivity of the one rod without an addition did not change. Thus, the rods with the above uranium dioxide additions possess both ionic and electronic conductivity.

An additional mixed conducting oxide electrode in tube form was prepared which consisted of an oxygen-ion conducting metal oxide of zirconia stabilized with 14 weight percent yttria and, at least partially dissolved therein, 20 weight percent of uranium dioxide. The tube was then fired in hydrogen at a temperature of 1800° C. and subsequently was electroded with platinum.

The above tube was then tested to determine that it was mixed conducting oxide, that is an oxide which exhibits both ionic and electronic conductivity. This tube was tested by a method devised for making ionic transport measurements which method is set forth in an article entitled "Bulk Versus Surface Conductivity of MgO Crystals" by Dr. S. P. Mitoff on pages 2561 and 2562 of the Oct. 15, 1964, issue of "The Journal of Chemical Physics," vol. 41, No. 8. This tube exhibited an ionic transport number less than one which showed that this disc was a mixed conducting oxide which had both ionic and electronic conductivity.

A composite article is prepared in accordance with FIGURE 1 of the drawing wherein a solid oxygen-ion conducting electrolyte member of zirconia stabilized with approximately 14 molecular percent calcia has adherent electrodes on opposite surfaces thereof. Each of the electrodes, which is a mixed conducting oxide and therefore exhibits both ionic and electronic conductivity, consists of zirconia stabilized with 14 weight percent yttria and, at least partially dissolved therein, 20 weight percent uranium dioxide. The solid stabilized oxygen-ion conducting member of stabilized zirconia is either prepared or purchased commercially.

The above electrode composition is mixed together and has added to it a 5 percent aqueous solution of polyvinyl alcohol to provide a slurry. The slurry is then painted on both sides of the electrolyte member. Infra-red heating is employed initially to dry the assembly of the electrolyte member with a coating on each of its surfaces. This assembly is then fired in air at 1350° C. for a period of time sufficient to densify the electrode structure. This sequence of steps provides a composite article having a solid oxygen-ion conducting member of stabilized zirconia, and an adherent electrode on opposite surfaces of the member, each of the electrodes consisting of stabilized zirconia, and 20 weight percent of uranium dioxide partially dissolved in the stabilized zirconia.

This composite article is then employed as the electrode-electrolyte-electrode body in a fuel cell in accordance with FIGURE 4 of the drawing. This cell is operated by employing a fuel such as hydrogen gas and a gaseous oxidant such as oxygen in accordance with the above-described operation of this cell.

While other modifications of this invention and variations thereof which may be employed within the scope of the invention have not been described, the invention is intended to include such as may be embraced within the following claims.

What I claim as new and desire to secure by Letters Patent of the United States is:

1. In an electrical device for operation at temperatures in excess of about 600° C., said device comprising a solid anode layer and a solid cathode layer as the electrodes separated by and in direct contact with a layer of a sintered solid-oxide ion electrolyte selected from the group consisting of stabilized zirconia and doped thoria, the improvement wherein at least one electrode is (a) substantially non-porous (b) tightly adherent to the electrolyte layer and (c) consists of a solid oxide ion electrolyte selected from the above mentioned group having at least partially dissolved therein, 2 weight percent to 40 weight percent of uranium dioxide, said mixture exhibiting both ionic and electronic conductivity.

2. In a fuel cell for operation at temperatures in excess of about 600° C., said fuel cell comprising a solid anode layer and a solid cathode layer as the electrodes separated by and in direct contact with a layer of a sintered solid-oxide-ion electrolyte selected from the group consisting of stabilized zirconia and doped thoria, the improvement wherein at least one electrode is (a) substantially non-porous (b) tightly adherent to the electrolyte layer and (c) consists of a solid oxide-ion electrolyte selected from the above mentioned group having at least partially dissolved therein, 2 weight percent to 40 weight percent of uranium dioxide, said mixture exhibiting both ionic and electronic conductivity.

References Cited

UNITED STATES PATENTS

| 3,138,487 | 6/1964 | Trager | 136—86 X |
| 3,160,527 | 12/1964 | Hess | 136—86 |
| 3,281,273 | 10/1966 | Oser | 136—86 |
| 3,300,344 | 1/1967 | Bray et al. | 136—86 |

FOREIGN PATENTS 22,030  10/1961  Germany.

WINSTON A. DOUGLAS, *Primary Examiner.*

ORVILLE F. CRUTCHFIELD, *Assistant Examiner.*

U.S. Cl. X.R.

136—120